Figure 1:
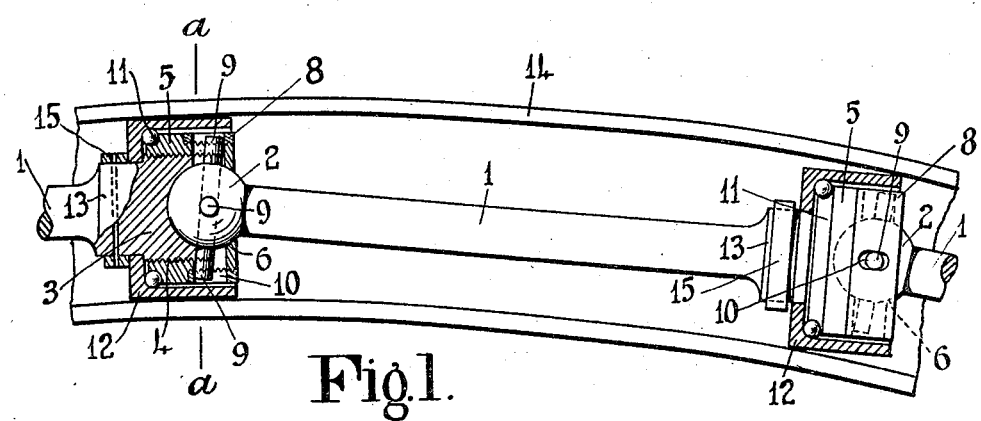

W. G. BAMBRIDGE.
FLEXIBLE SHAFT.
APPLICATION FILED MAR. 16, 1909.

944,228.

Patented Dec. 21, 1909.

Witnesses:—
W. P. Burke
Edw. D. Spring

Inventor.
William Ginns Bambridge
By
ATTY

UNITED STATES PATENT OFFICE.

WILLIAM GINNS BAMBRIDGE, OF KETTERING, ENGLAND, ASSIGNOR TO THE BAMBRIDGE PATENT FLEXIBLE SHAFT COMPANY LIMITED, OF KETTERING, ENGLAND.

FLEXIBLE SHAFT.

944,228.  Specification of Letters Patent.  Patented Dec. 21, 1909.

Application filed March 16, 1909. Serial No. 483,780.

*To all whom it may concern:*

Be it known that I, WILLIAM GINNS BAMBRIDGE, subject of the King of Great Britain, residing at Kettering, in the county of Northampton, England, have invented new and useful Improvements in or Relating to Flexible Shafts, of which the following is a specification.

This invention relates to improvements in flexible shafts used for various driving purposes such for example as for driving portable appliances, tools and the like.

The invention has reference to the type of flexible shaft which comprises a rotary shaft, consisting of a series of short shafts or spindles joined together by intermediate universal joints or couplings the said rotary shaft being located within an outer non-rotatable flexible cover or casing.

The object of the present invention is to improve the construction of the rotary shaft and more particularly of its joints or couplings in a manner and for a purpose now to be described.

Flexible shafts of the above type have hitherto been of a construction which has permitted of their rotation for driving purposes in one direction only, that is to say, the double motion joints between the short shafts have been formed separate from the shafts, and the ends of the latter have been screw threaded to receive the members of the joints thereon. Such flexible shafts have only been adapted for rotation in one direction inasmuch as if the direction of rotation has been reversed the series of shafts and connecting joints have unscrewed and become detached from each other and thus rendered the shaft of no material use for driving in but one direction. A further disadvantage of this previous construction of rotary shaft is that the short lengths of shaft are liable to break off at the part where they are reduced and screw threaded for their attachment to the connecting joints. According to the present invention however, these above named disadvantages are obviated and the invention comprehends a flexible shaft which is constructed in such a manner that the direction of its rotation may be reversed so that it will rotate in either direction to transmit the drive throughout its length and, moreover, its strength is greatly increased owing to the fact that the joint members are formed integrally with the short shafts instead of being screwed thereon.

As previously stated, this invention is more particularly concerned in the construction of the rotary shaft, and any known form or forms of outer, or combined inner and outer coverings or casings of the flexible tube type may be employed to form the non-rotatable exterior of the flexible shaft.

The inner rotatable shaft, according to the present invention is made up of a series of short shafts or spindles connected together at their ends by universal joints or couplings of improved construction. These improved couplings consist of universal joints of the ball and socket type the respective members of the joint being formed integrally with the meeting or adjacent ends of the shafts.

The invention will be hereinafter described in detail and in order that it may be readily understood reference will be made to the accompanying drawings in which:—

Figure 2:
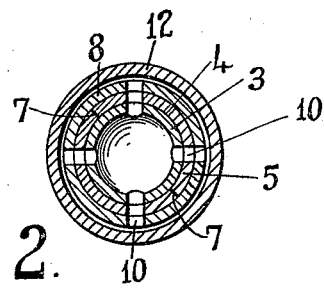
Figure 3:
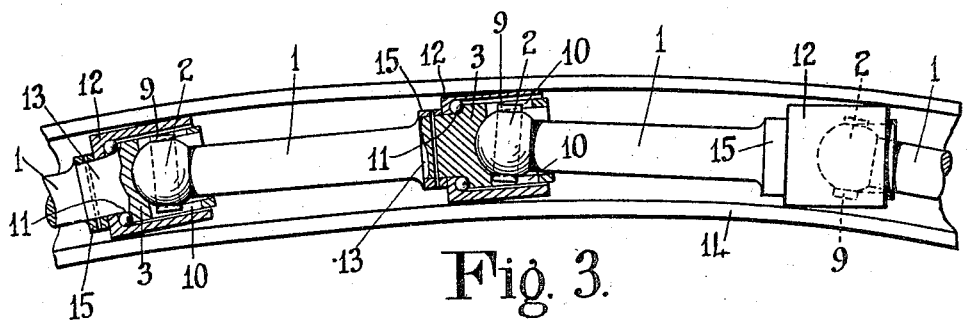

Figure 1, shows in section a portion of a flexible shaft constructed in accordance with one embodiment of this invention. Fig. 2, is a cross section taken on the line *a—a* of Fig. 1. Fig. 3, drawn to a larger scale is a partly sectional view of an alternative construction of a flexible shaft according to this invention.

As previously stated a flexible shaft comprises or is made up of short shafts or spindles 1 connected together at their ends by universal joints or couplings of the ball and socket type. These couplings or joints are, according to the present invention, of improved construction the ball and socket members 2 and 3 respectively being formed integrally with the shafts 1, as shown in Fig. 1.

The ball 2 on the end of one short shaft is adapted to fit within the socket 3 on the adjacent end of the next succeeding shaft and so on throughout the entire series. The exterior edge or circumference 4 of each of the sockets 3 is screw threaded for the reception of collars 5 which are internally recessed or cupped out at 6 and adapted to fit around the back or neck of the balls 2. These collars 5 are passed over the short shafts 1 on which the balls are formed and when screwed upon the sockets 3 hold the balls 2 in position within said sockets. The said collars are made in halves as shown at 7 in Fig. 2 in order that they may be passed around the shafts 1 a nut 8 being screwed on to the two halves to keep them together after they are located around the shafts. The collars are made sufficiently large around the neck of the ball to permit the latter a range of movement for the bending of the shaft as shown in Fig. 1.

For the purpose of transmitting the rotary drive through the ball joint connections just described, the ball member 2 of each of said joints is furnished with pins 9 which pass through said ball 2 and extend into slots 10 in the corresponding socket members 3. These pins 9 are preferably two in number and are driven into holes located at right angles to each other through the body of the ball 2. The said pins 9 project on each side of the ball 2 as shown in Fig. 1 and extend into the slots 10 which are formed in the socket 3, the collar 5 threaded thereon and the nut 8 which maintains the two parts or halves of the collar 5 together. The projection of the pins within the slots 10 formed partly in the sockets 3, collars 5 and their nuts 8 as just described, prevents the said nuts unscrewing from the collars and also the collars unscrewing from the socket members when the shaft is rotated, and, as the ball 2 and socket members 3 are formed integrally with the intermediate shafts 1 and the pins 9 passing through said joint members transmit the drive from one short shaft to another, the whole series of shafts may be rotated in either direction to effectively transmit the drive.

The slots 10 are located longitudinally in the sockets 3, collars 5 and nuts 8 as shown to the right of Fig. 1, to permit the pins 9 to move therein when the shaft bends and the rotary drive of the shaft is taken by the engagement of the pins 9 with the sides of the said slots 10.

An important feature of the invention is that the ball 2 and socket 3 members are formed solid with the intermediate shafts 1 and the latter are not reduced in diameter at their ends thus maintaining the maximum strength throughout the whole length of the shaft.

The ball members 2 may be formed on the opposite ends of every alternate short shaft said balls entering sockets formed on the opposite ends of the intermediate shafts, or, each short shaft may be provided with a ball member at one end and a socket at the opposite end as illustrated in the accompanying drawing, the ball members being located within the socket members of the adjacent shafts.

In the alternative construction of a flexible shaft which is intended for light work and illustrated in Fig. 3, the socket 3 of each shaft 1 is made solid, that is without a collar around the back or neck of the ball 2, and one pin 9, which extends right through and projects on each side of the ball into the slots 10, is preferably employed and holds the lengths of shaft 1 together.

The collars 5 of the construction shown in Fig. 1, and the exterior of the sockets 3 in that illustrated in Fig. 3 are preferably provided with a ball race 11 and a rotatable ring or sleeve 12 is mounted on a reduced portion 13 of the socket to form a ball bearing said sleeves 12 coming into contact with the interior of the flexible tubular casing 14 when the latter is bent.

The sleeves 12 are kept in place on the reduced portions 13 by means of small collars 15 and the ball bearings support the flexible shaft within the casing 14 and produce an easy running.

What I claim then is:—

1. A flexible driving shaft comprising a series of spindles, a series of univeral joints to couple said series of spindles together consisting of ball and socket members integrally formed with said spindles and located in engagement one with the other, said socket members having slots therein, pins projecting from said ball members and extending into the slots in the socket members to transmit rotation from one spindle to another in either direction, ball races formed on said socket members, sleeves on the socket members and covering the slots therein, balls located between said sleeves and the ball races on the socket members, collars to hold said sleeves in position, and an outer flexible casing inclosing the before mentioned parts, substantially as described.

2. A flexible driving shaft comprising a series of spindles, a series of universal joints to couple said series of spindles together consisting of ball and socket members integrally formed with said spindles and located in engagement one with the other, split collars surrounding said ball members to screw upon the socket members to hold said ball and socket members together, nuts to screw upon said split collars to hold the split portions thereof together, said socket members and collars and nuts having slots therein, and pins projecting from the ball members and extending into the said slots, substantially as and for the purpose described.

3. A flexible driving shaft comprising a series of spindles, a series of universal joints to couple said series of spindles together consisting of ball and socket members integrally formed with said spindles and located in engagement one with the other, split collars surrounding said ball members to screw upon the socket members to hold said ball and socket members together, nuts to screw upon said split collars to hold the split portions thereof together, said socket members and collars and nuts having slots therein, pins projecting from the ball members and extending into the said slots, ball races formed on said socket members, sleeves located thereover, balls located between said sleeves and the ball races on the socket members, collars to hold said sleeves in position, and an outer flexible casing inclosing the before mentioned parts, substantially as described.

In testimony whereof I have signed my name to this specification in the presence of two subscribing witnesses.

WILLIAM GINNS BAMBRIDGE.

Witnesses:
   E. N. LEWIS,
   GEORGE LESTER.